(12) United States Patent
Inoue (10) Patent No.: US 6,489,890 B1
(45) Date of Patent: *Dec. 3, 2002

(54) SECURITY DEVICE

(75) Inventor: Naoyuki Inoue, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,827

(22) Filed: Oct. 23, 1998

(30) Foreign Application Priority Data

Jun. 16, 1998 (JP) ............................................. 10-168964

(51) Int. Cl.[7] ............................................... G08B 13/14

(52) U.S. Cl. ................................ 340/568.1; 340/545.6; 340/687; 361/752

(58) Field of Search ............................. 340/568.1, 571, 340/572.8, 572.9, 545.6, 687; 361/752, 753, 756, 759

(56) References Cited

U.S. PATENT DOCUMENTS

| | | | | | |
|---|---|---|---|---|---|
| 4,150,371 A | * | 4/1979 | Scaglione | ................ | 340/545.6 |
| 4,342,068 A | * | 7/1982 | Kling | ........................ | 361/752 |
| 5,304,987 A | * | 4/1994 | Brunson et al. | ........ | 340/687 X |
| 5,353,015 A | * | 10/1994 | Robinson | ................ | 340/545.6 |
| 5,675,321 A | * | 10/1997 | McBride | ................ | 340/571 X |
| 5,818,345 A | * | 10/1998 | Sjooquist | ................ | 340/571 X |
| 5,936,526 A | * | 8/1999 | Klein | ........................ | 340/571 |
| 5,945,915 A | * | 8/1999 | Cromer et al. | .......... | 340/571 X |

FOREIGN PATENT DOCUMENTS

| | | | | |
|---|---|---|---|---|
| JP | 17623 | * | 1/1984 | ................ 340/687 |
| JP | 64-76347 | | 3/1989 | |
| JP | 6-12589 | | 1/1994 | |

* cited by examiner

Primary Examiner—Thomas Mullen
(74) Attorney, Agent, or Firm—Staas & Halsey LLP (57) ABSTRACT

With a security device according to the present invention, contact positions of a printed board and those of a casing are electrically connected, and a state in which the contact positions are separated is electrically detected, so that the moment at which the electronic equipment is disassembled can be detected, and with this feature, security for electronic equipment can be insured with simple configuration.

3 Claims, 11 Drawing Sheets

SECURITY DEVICE

FIELD OF THE INVENTION

The present invention relates to a security device and particularly, to a security device that prevents the information from inside of the device being stolen by disassembling a case of the device.

BACKGROUND OF THE INVENTION

In recent years, there have been strong needs for a security function for information in electronic equipment such as a personal computer. Especially, there are many cases where a storage device such as a hard disk with information stored therein is stolen, and countermeasures against the information theft will be required in the future. Sometimes illegal adaptations are made by disassembling the electronic equipment, therefore, there is a need of a means for determining adaptation's history or the like in order to provide security against the illegal adaptations.

At present, in order to provide a security, the information is stored in a coded form, while, as a countermeasure against disassembly of a device, special screws are provided so that the construction becomes difficult to be disassembled by an ordinary users. However, even when data is stored in a coded form, or even when special screws are provided, these measures do not protect the information medium itself. Furthermore, after a theft, there is ample of time for decoding of the data, hence there still uneasiness in the security of information.

Under those circumstances, as disclosed in Japanese Patent Laid-Open Publication No. HEI 6-12589, there has been proposed a technique for detecting not only disassembly of a case but also a hole made thereon or destruction by installing signal lines on an inner surface of a housing and detecting disconnection of any of the lines. In addition to it, as disclosed in Japanese Patent Laid-Open Publication No. SHO 63-76347, there has been proposed a technique for deleting internal data with a switching mechanism provided in the casing which is actuated when the casing is disassembled.

In the technique in Japanese Patent Laid-Open Publication No. HEI 6-12589, detection of destruction of a casing is possible, however, because signal line are placed throughout the internal surface of the casing, an increase in the detection points makes the construction for realizing the security function more complicated. Especially, in Japanese Patent Laid-Open Publication No. SHO 64-76347, as a special switching construction is provided inside the casing, the switching function works in response to disassembly of the casing, which also makes construction of the casing complicated. As described above, the constructions disclosed in the two Publications above are electrically and mechanically complicated only for the purpose of performing the security function.

SUMMARY OF THE INVENTION

It is an object of the present invention to provide, for solving the problems described above, a security device which can ensure security against leakage of information with simple configuration.

With the present invention, contact positions of a printed board and those of a casing are electrically connected, and a state in which the contact positions are separated is electrically detected, so that the moment at which the electronic equipment is disassembled can be detected, and with this feature, security for electronic equipment can be insured with simple configuration.

With the present invention, at least a portion of a casing comprises a frame ground with its contact position as a terminal, and a contact position on at least a portion of a printed board comprises a terminal, so that the electrically connected state between the positions can be maintained with simple configuration.

With the present invention, the contact positions are connected with a pull-up resistor, so that an act of disassembling a case can easily be detected with electric changes between HIGH and LOW.

With the present invention, when separation between contact positions is detected, an alarm is generated, so that illegal acts such as theft can be alerted to the surrounding people with simple configuration, and with this feature, security against theft of information can be insured.

With the present invention, when separation between contact positions is detected, data is rewritten, so that, even if data is illegally acquired, the contents of the data would have been broken out, which can prevent the data itself from theft, and with this feature, security against theft of information can be insured with simple configuration.

With the present invention, a state in which separation between contact positions has been detected is maintained, and power supply to electronic equipment is shut down while the state is maintained, so that, when it is found that the equipment has been disassembled once for the purpose of illegal adaptations on the equipment or its unauthorized use, the use of the equipment is forcefully inhibited thereafter, and with this feature, unauthorized use of the equipment due to reassembly after its being shipped can be prevented before its use, and for this reason, security against theft of information can be insured with simple configuration.

With the present invention, a state in which separation between contact positions has been detected is maintained, and an operation of the electronic equipment is reset while the state is maintained, so that, when it is found that the equipment has been disassembled once for the purpose of illegal adaptations on the equipment or its unauthorized use, the use of the equipment is forcefully inhibited thereafter regardless of power supply being effected or not, and with this feature, unauthorized use of the equipment due to reassembly after its being shipped can be prevented before its use, and for this reason, security against theft of information can be insured with simple configuration.

With the present invention, counting is executed each time a separation between contact positions is detected, and the count is read out under the authorization, so that, when it is found that the equipment has been disassembled once for the purpose of illegal adaptations on the equipment or its unauthorized use, the history thereof is maintained, and with this feature, determination can be made as to whether there has been any change in the equipment for an illegal purpose or the like or not, and for this reason, security against theft of information can be insured with simple configuration.

Other objects and features of this invention will become understood from the following description with reference to the accompanying drawings.

DESCRIPTION OF THE PREFERRED EMBODIMENT

Detailed description is made hereinafter for preferred embodiments of the security device according to the present invention with reference to the related drawings.

Figure 1:
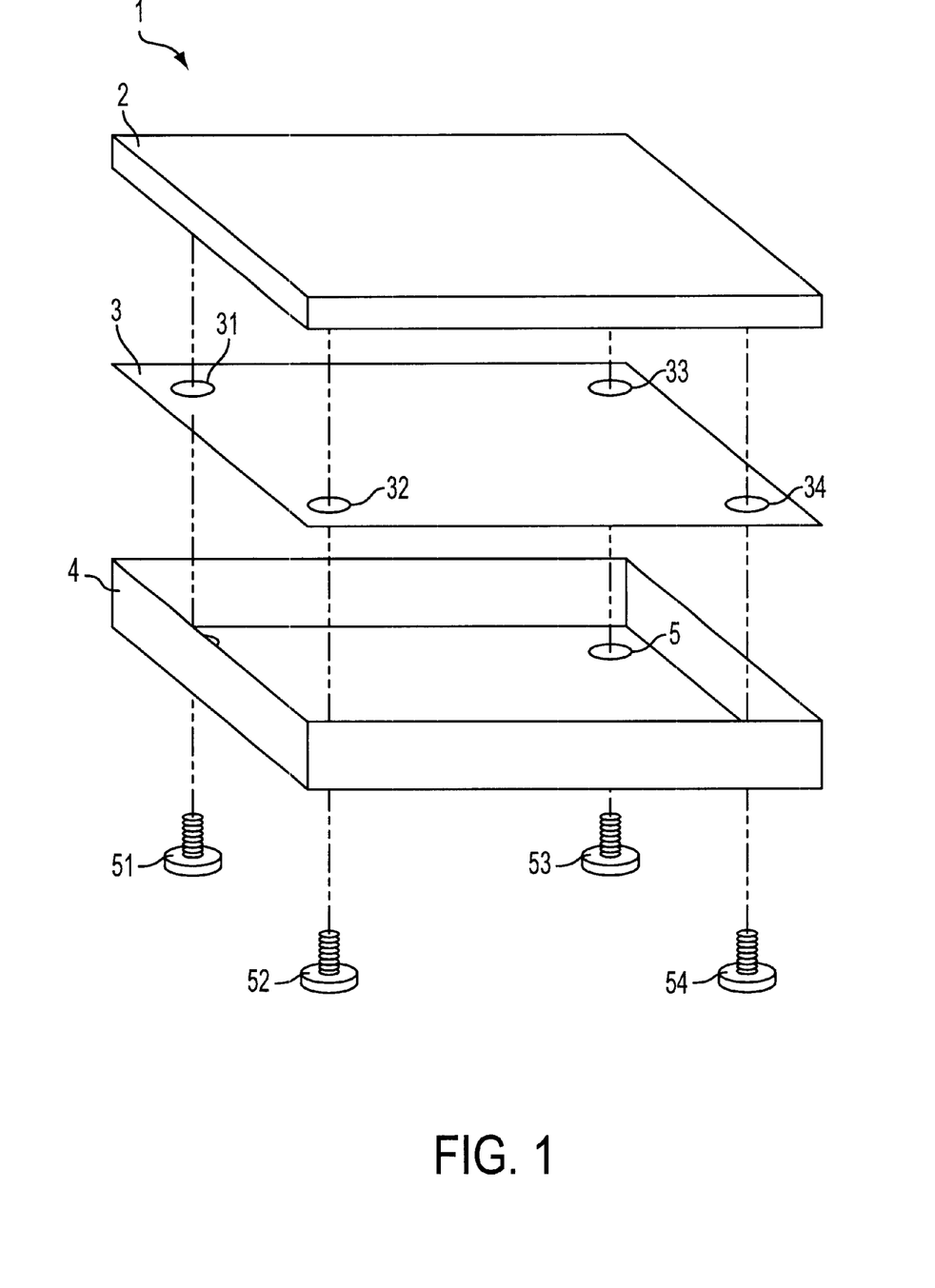
FIG. 1 is an exploded view showing an appearance of electronic equipment with a security device according to Embodiment 1 of the present invention mounted thereon.

At first, description is made for configuration. FIG. 1 is an exploded view showing an appearance of electronic equipment with a security device according to Embodiment 1 of the present invention mounted thereon. In the figure, the reference numeral 1 indicates a main unit of the equipment. The main unit of the equipment 1 has a rectangular construction in which a printed board 3 with an electronic circuit packaged thereon is located between an upper cover 2 and a lower cover 4. The printed board 3 is accommodated in a case formed by the upper cover 2 and the lower cover 4.

Each of the upper cover 2, printed board 3, and the lower cover 4 has screw holes for engagement at four corners thereon respectively. For example, the printed board 3 has screw holes for engagement 31, 32, 33, and 34 at four corners thereon. The printed board 3 is screwed down to the casing with screws 51, 52, 53, and 54, corresponding to the screw holes 31, 32, 33, and 34 respectively, and fixed inside the casing. The lower cover includes, for example, platings to bring the lower cover into conduction. The plating 5 plays a role of a frame ground to the casing.

Figure 2:
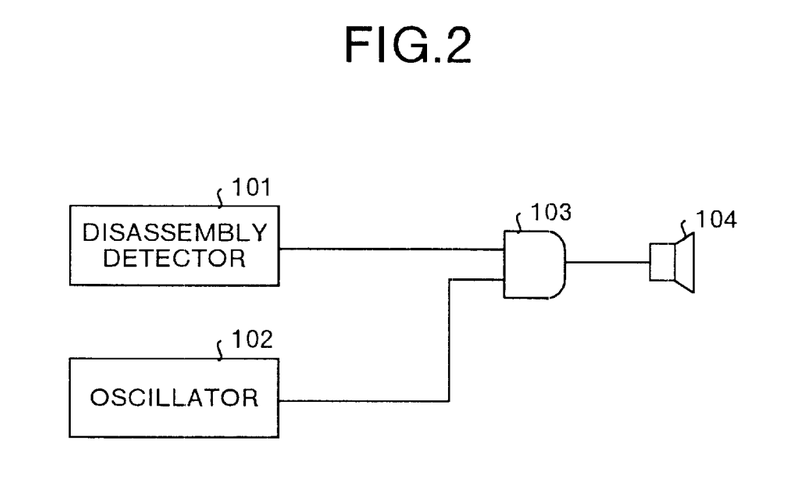
FIG. 2 is a block diagram showing an example of configuration of the security device according to Embodiment 1.

Next description is made for the printed board 3. FIG. 2 is a block diagram showing one configuration of the security device to be mounted on the printed board 3. The security device constitutes a part of a circuit packaged on the printed board 3, and comprises, as shown in FIG. 2, a disassembly detector 101, an oscillator 102, a AND circuit 103 and a buzzer 104. This disassembly detector 101 electrically detects the fact that the main unit 1 of the device, namely the casing, is disassembled and outputs a disassembly detection signal (a state of "H" (HIGH)) The oscillator 102 generates pulses to make the buzzer 104 alert. The AND circuit 103 supplies the pulses from the oscillator 102 to the buzzer 104 when the disassembly detection signal outputted from the disassembly detector 101 is "H". The buzzer 104 outputs a sound according to the pulses outputted from the AND circuit 103.

Figure 3:
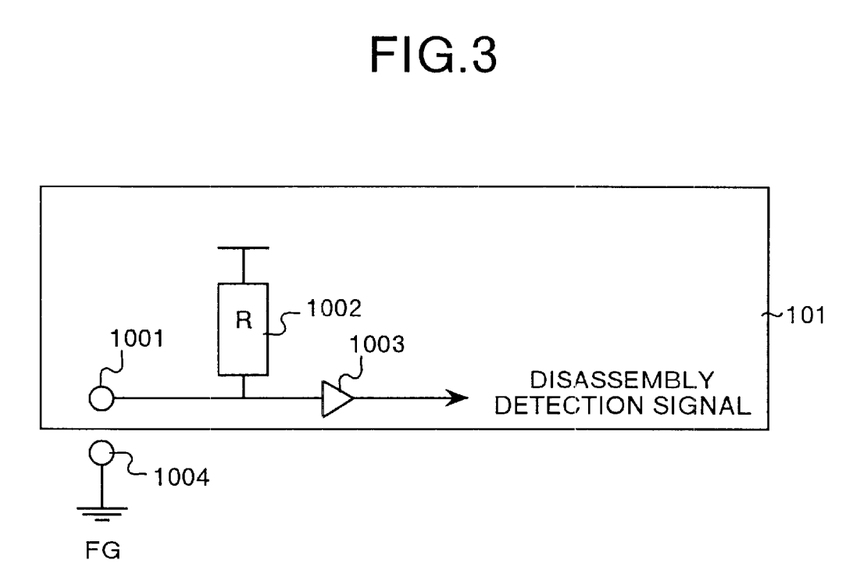
FIG. 3 is a circuit diagram showing an example of simplified configuration of a disassembly detector according to Embodiment 1.

A detailed description is made hereinafter for the disassembly detector 101. FIG. 3 is a circuit diagram showing a simplified configuration of the disassembly detector 101. The disassembly detector 101 is mounted on the printed board 3 matching, for example, a position of the screw hole 31. The disassembly detector 101 comprises, as shown in FIG. 3, a terminal 1001 provided in the screw hole 31, a resistor 1002 for pull-up, and an amplifier 1003 for amplifying a detection signal against disassembly. When the casing is assembled, the screw hole 31 and a screw hole of the lower cover 4 are coupled to each other. A terminal 1004 is provided in the screw hole of the lower cover 4, and the terminals 1001 and 1004 are electrically connected to each other. Connection between the terminals 1001 and 1004 and separation from each other can be realized by giving electric signals "L" (Low) and "H" to the terminals through the resistor 1002 for pull-up.

Figure 4:
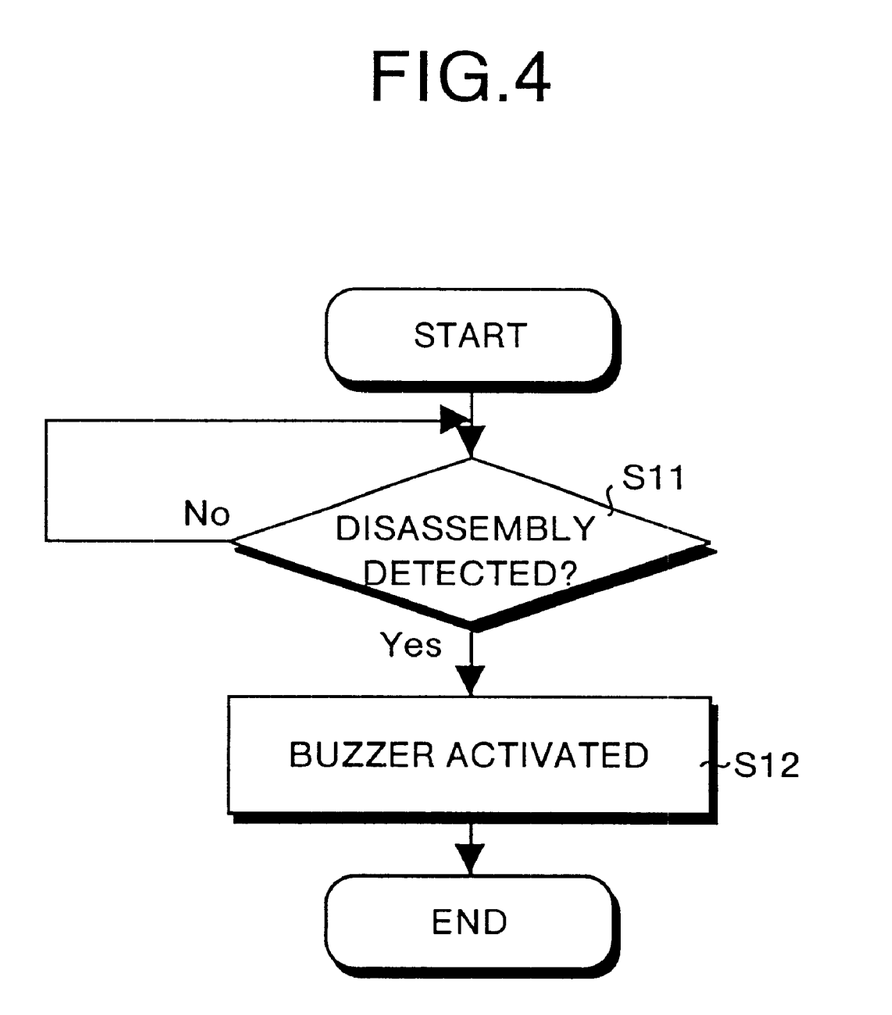
FIG. 4 is a flow chart for explaining a security operation according to Embodiment 1.

Next, description for operations of Embodiment 2 will be discussed. FIG. 4 is a flow chart for explaining a security operation according to Embodiment 1. It should be noted that this flow chart explains operations of the entire security device shown in FIG. 2. When the screw fixed to the screw hole 31 of the main unit of the device 1 is taken out of the hole, the printed board 3 and the lower cover 4 are released from the fixed state. When the printed board 3 is taken out of the casing, the contact between the terminal 1001 and the terminal 1004 is cut off.

When an electrical contact between the terminal 1001 and terminal 1004 is maintained, "L" signal is outputted through the connection between terminal 1001 and 1004 having frame ground level, however, when the contact is cut off, the disassembly detection signal changes to "H" because of the pull-up resistor. Namely, the change in the disassembly detection signal to "H" indicates that disassembly of the casing is detected (step S11), so that a pulse signal from the oscillator 102 is supplied to the buzzer 104, and the buzzer 104 is activated (step S12).

As described above, with Embodiment 1, it is electrically detected whether a screw on the main unit 1 of the device is taken out of the unit not. The buzzer is activated when the screw is taken off, so that surrounding people can be alerted of illegal acts such as theft, with a simple configuration. With this feature, security against theft of information can be insured.

At least a part of the casing comprises a frame ground of which a contact position works as a terminal, and a contact position on at least a part of the printed board 3 comprises a terminal, so that it is possible to latch electric connection therebetween with a simple construction.

In addition, the contact positions are connected with a pull-up resistor, so that an act of disassembling the casing can easily be detected with electric changes between HIGH and LOW.

It should be noted that use of the buzzer 104 is not limited to only the security device, but may be used to perform other functions.

A disassembly detector 101 may be provided for each of a plurality of screw holes, and in this case, the security function can be enhanced.

Although description was made above for the technique of realizing the security function of alerting surrounding people with a sound to prevent disassembling the casing in Embodiment 1, the present invention is not limited to this Configuration. For example in Embodiment 2 described below, the security function against theft of information may be insured against the acts of disassembling the casing by rewriting information inside the device, such as deletion thereof.

Figure 5:
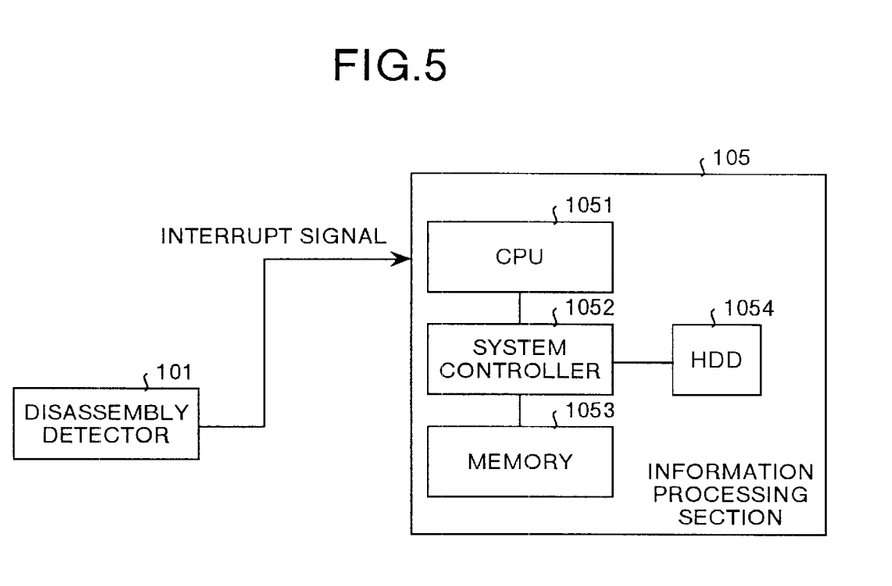
FIG. 5 is a block diagram showing an example of configuration of a security device according to Embodiment 2.

In Embodiment 2, a personal computer is used as electronic equipment. At first, description will be made for the configuration thereof. FIG. 5 is a block diagram showing an example of a configuration of a security device according to Embodiment 2 of the present invention. In addition to the same disassembly detector 101 as that in Embodiment 1, this security device comprises an information processing section 105 and is mounted on the printed board 3.

The information processing section 105 comprises, as shown in FIG. 5, a CPU 1051 for controlling the entire equipment according to a program which is not shown in the figure, a system controller 1052 for controlling a memory, a memory 1053 for writing and reading data therein and therefrom under controls by the system controller 1052, and a hard disk drive (HDD) 1054 for writing and reading data in and from a hard disk not shown under control by the system controller 1052. It should be noted that, in Embodiment 2, the disassembly detection signal "H" outputted from the disassembly detector 101 is inputted in the CPU 1051 as an interrupt signal.

Figure 6:
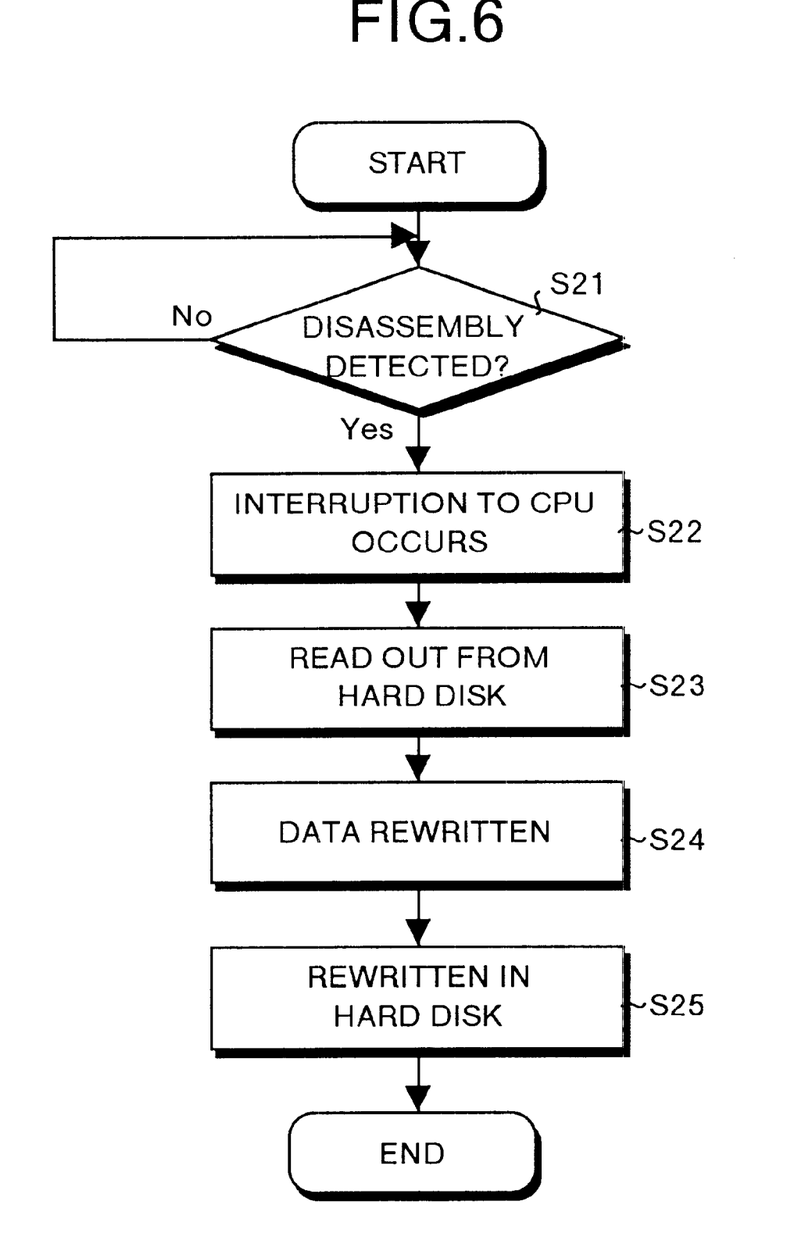
FIG. 6 is a flow chart for explaining a security operation according to Embodiment 2.

Next, a description will be made for the operation of Embodiment 2. FIG. 6 is a flow chart for explaining the security operations according to Embodiment 2. It should be noted that this flow chart includes controls by the CPU 1051 and explains operations of the entire security device shown in FIG. 5. When disassembly is detected by the disassembly detector 101, like in Embodiment 1 (step S21), an interrupt signal is outputted from the disassembly detector 101 to the CPU 1051 (step S22). Data is read out from the hard disk in response to occurrence of this interruption (step S23), and the data is rewritten (step S24). Then, the rewritten data is written in the original position again (step S25). It should be noted that the processing of rewriting in step S24 includes deletion of the data or rewriting a meaningless information on the original data or the like.

As described above, with Embodiment 2, the contents stored in a storage medium such as a hard disk are rewritten, for example, when it is detected that a screw of the main unit 1 of the device is taken out of the unit, so that, even if data is stolen, the stolen data would be meaningless, thus preventing theft of the data. With this feature, security against theft of information can be insured with simple configuration.

Although not particularly mentioned, in the present invention, security against theft of information may be insured by disabling use of electronic equipment after its unauthorized disassembly like in Embodiment 3 described below.

Figure 7:
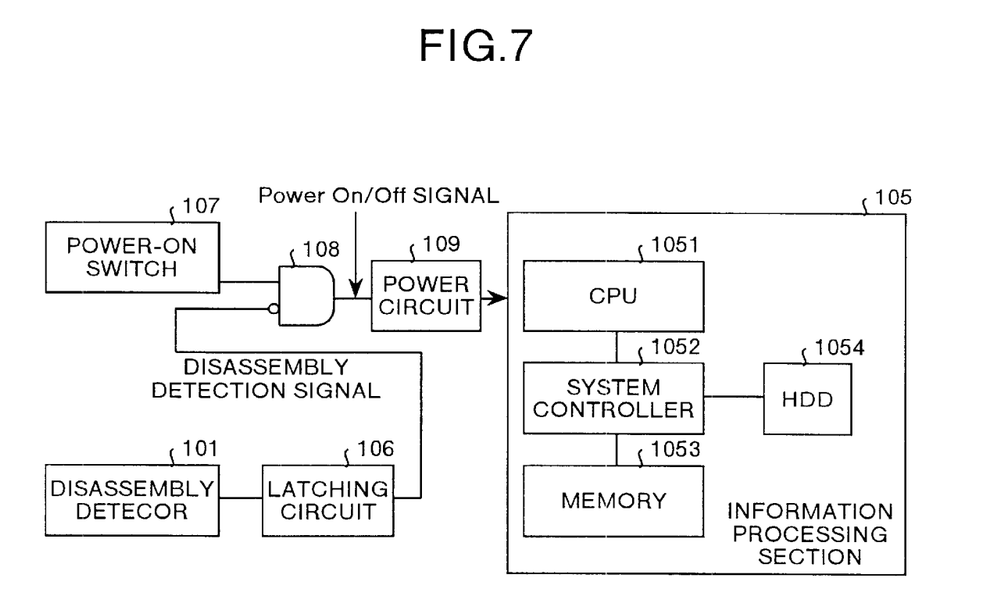
FIG. 7 is a block diagram showing an example of configuration of a security device according to Embodiment 3.

Embodiment 3 also utilizes up a personal computer, as an example of the electronic equipment, in the following description. At first, a description will be made for a configuration of Embodiment 3. FIG. 7 is a block diagram showing an example of a configuration of a security device according to Embodiment 3 of the present invention. In addition to the same disassembly detector 101 and the information processing section 105 of Embodiment 2, this security device comprises a latching circuit 106, a power-on switch 107, a AND circuit 108 and a power circuit 109, and is mounted on the printed board 3.

The latching circuit 106 is connected to an output of the disassembly detector 101, and latches, when a disassembly detection signal "H" is outputted from the disassembly detector 101, the disassembly detection signal "H". The power-on switch 107 is a hard switch for turning the power ON. The AND circuit 108 is connected to an output of the latching circuit 106 and an output of the power-on switch 107, and when output from the latching circuit 106 is not "H", namely when the equipment is not being illegally disassembled, passes an ON/OFF signal outputted from the power-on switch 107 to the power circuit 109. The power circuit 109 is connected to the output of the AND circuit 108 and supplies power to the information processing section 105 when a power-ON signal is received.

Figure 8:
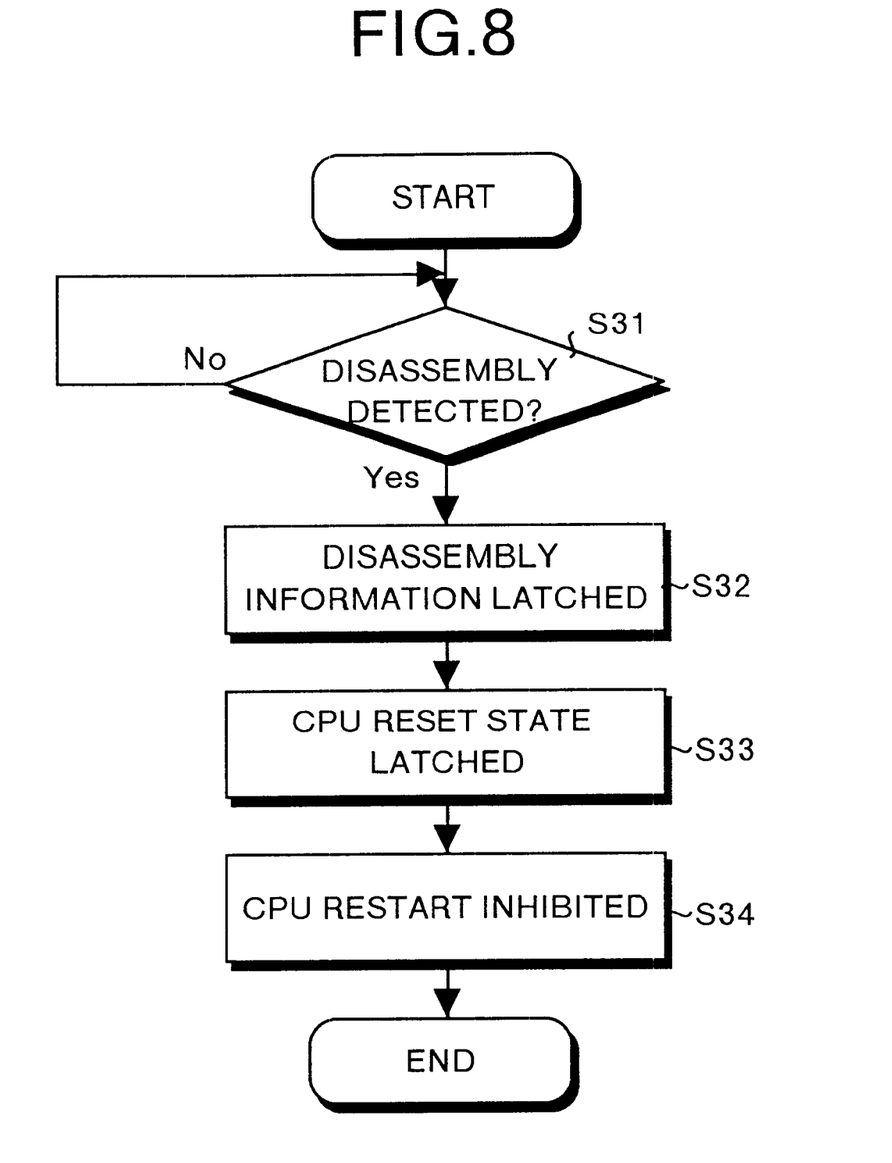
FIG. 8 is a flow chart for explaining a security operation according to Embodiment 3.

Next, a description will be made for operation of Embodiment 3. FIG. 8 is a flow chart for explaining a security operation according to Embodiment 3. It should be noted that this flow chart explains the operation of the entire security device shown in FIG. 7. When disassembly is detected by the disassembly detector 101, like in Embodiment 1 (step S31), a disassembly detection signal is latched by the latching circuit 106 (step S32). With this operation, the signal "H" is supplied to the AND circuit 108.

Namely, as power is not supplied to the information processing section 105, a reset state of the CPU 1051 is latched (step S33). Therefore, even if the power-on switch 107 is turned ON, since a power-OFF signal is supplied to the power circuit 109, power can not be supplied from the power circuit 109 to the information processing section 105, and a restart of the CPU 1051 is inhibited (step S34).

As described above, with Embodiment 3, even if a case is reassembled after an illegal disassembly, a power ON/OFF signal gated off with a latched signal inhibits the power to the information processing section 105 from being turned ON again. With this feature, when it is found that the equipment has been disassembled once for the purpose of illegal adaptations on the equipment or its unauthorized use, the use of the equipment is forcefully inhibited thereafter, and for this reason, unauthorized use of the equipment due to reassembly after its shipping can be prevented before its use.

Although description has been made for the function for security of turning ON the power after detection of disassembly of the casing is invalidated, in Embodiment 3, in the present invention, a function for security of a restart of the CPU after detection of disassembly of the casing is invalidated may be realized like in Embodiment 4 described below.

Figure 9:
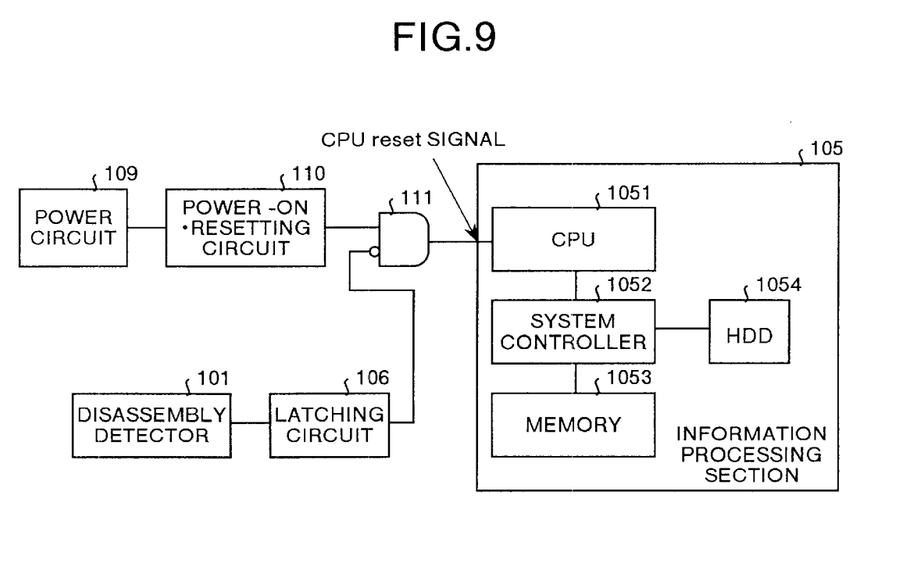
FIG. 9 is a block diagram showing an example of configuration of a security device according to Embodiment 4.

Embodiment 4 also utilizes a personal computer as electronic equipment as an example, in the following description. At first, description will be made for a configuration of Embodiment. FIG. 9 is a block diagram showing an example a configuration of a security device according to Embodiment 4 of the present invention. In addition to the same disassembly detector 101, latching circuit 106, information processing section 105 and power circuit 109 of Embodiment 3, this security device comprises a power-on•resetting circuit 110 and an AND circuit 111, and is mounted on the printed board 3.

The power-on•resetting circuit 110 is a hard switch for turning the power ON/OFF from the power circuit 109. The AND circuit 111 is connected to an output of the latching circuit 106 and an output of the power-on•resetting circuit 110, and when output from the latching circuit 106 is not "H", namely when the equipment is not illegally disassembled, a CPU set/reset signal is outputted from the power-on•resetting circuit 110 to the CPU 1051.

Figure 10:
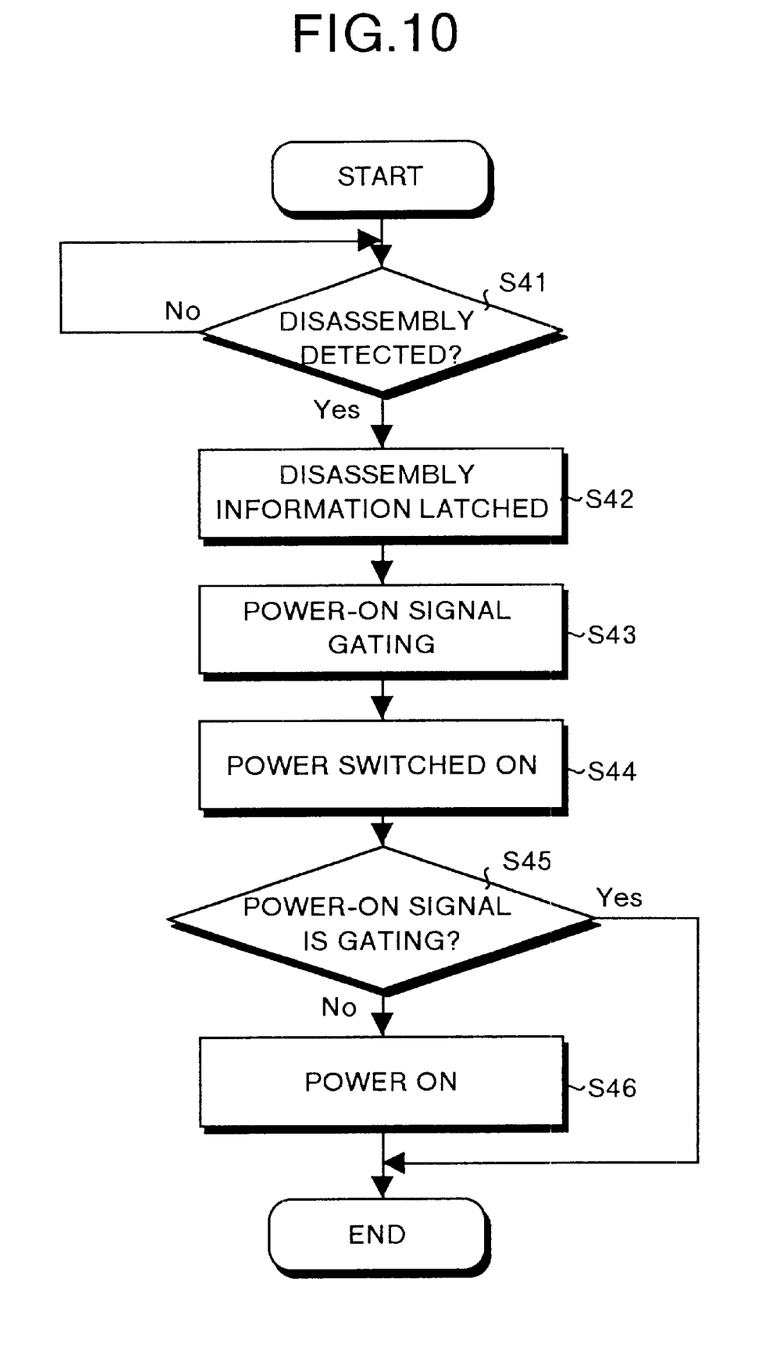
FIG. 10 is a flow chart for explaining a security operation according to Embodiment 4.

Next, a description will be made for an operation of Embodiment 4. FIG. 10 is a flow chart for explaining a security operation according to Embodiment 4. It should be noted that this flowchart explains the operation of the entire security device shown in FIG. 9. When disassembly is detected by the disassembly detector 101, like in Embodiment 1 (step S41), a disassembly detection signal is latched by the latching circuit 106 (step S42). With this operation, the signal "H" is supplied to the AND circuit 111.

Namely, as a CPU reset signal is sent to the CPU 1051, a reset state of the CPU 1051 is latched. In this case, a power-ON signal is gated regardless of changes in output from the power-on•resetting circuit 110, so that the output from the AND circuit 111 is a CPU reset signal (step S43).

When the power-on resetting circuit 110 is turned ON, in where release of the reset signal can not be executed to the CPU 1051 as described above (step S44), and if the power has been turned ON (Affirmative in step S45), the CPU reset state is latched. On the other hand, if the power is to be turned ON anew (Negative in step S45), the power is turned ON (step S46), a CPU reset signal is supplied from the AND circuit 111 to the CPU 1051, and the reset state of the CPU 1051 is effected.

As described above, with Embodiment 4, even if a case is reassembled after an illegal disassembly, release of the reset signal to the CPU 1051 can be inhibited with the latched disassembly detection signal. With this feature, when it is found that the equipment has been disassembled once for the purpose of illegal adaptations on the equipment or its unauthorized use, the use of the equipment is forcefully inhibited thereafter, and for this reason, unauthorized use of the equipment due to reassembly after its shipping can be prevented before its use.

Although the function for the aforementioned security is programmed to be performed at the point of time when illegal disassembly to equipment is detected in Embodiments 1 to 4, the present invention is not limited to that function, and an act of disassembly such as illegal adaptations may be detected when the case is disassembled due to its repair through an authorized sequence like in Embodiment 5 described below.

Figure 11:
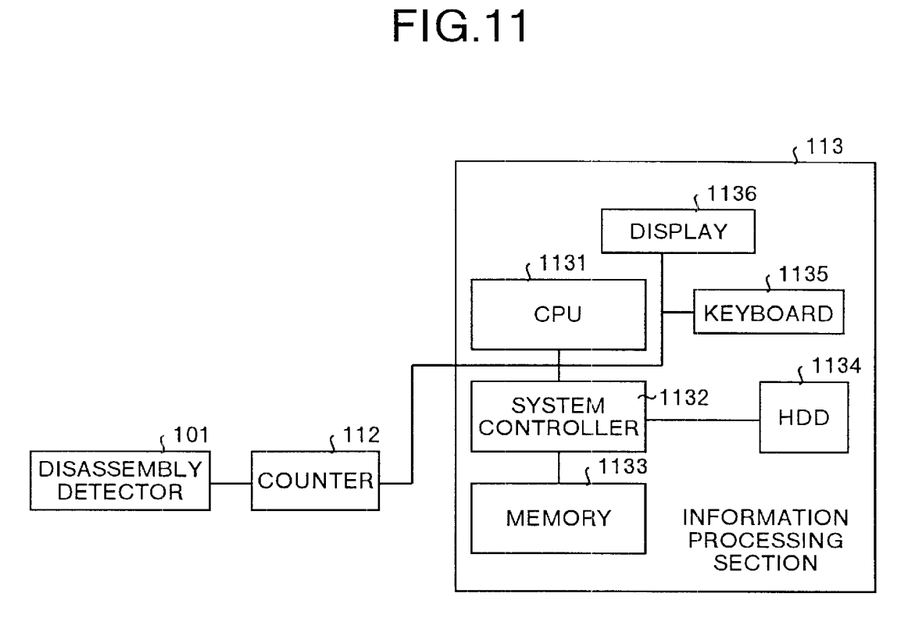
FIG. 11 is a block diagram showing an example of configuration of a security device according to Embodiment 5.

Embodiment 5 also utilizes a personal computer as electronic equipment, as an example in the following description. At first, a description will be made for a configuration of Embodiment 5. FIG. 11 is a block diagram showing an example of configuration of a security device according to Embodiment 5 of the present invention. In addition to the same disassembly detector 101 of Embodiment 1 this security device comprises a counter 112 and an information processing section 113, and is mounted on the printed board 3.

The counter 112 is connected to an output of the disassembly detector 101 as well as to the information processing section 113, counts a value each time when a disassembly detection signal is outputted from the disassembly detector 101, and latches the number of times. The information processing section 113 comprises, as shown in FIG. 11, a CPU 1131 for controlling the entire equipment according to a program which is not shown in the figure, a system controller 1132 for controlling a memory, a memory 1133 for writing and reading data therein and therefrom under controls by the system controller 1132, a HDD 1134 for writing and reading data in and from a hard disk not shown under controls by the system controller 1132, a keyboard 1135 used for inputting data such as a password, and a display 1136 for displaying thereon inputted data or the like. It should be noted that the memory 1133 stores therein a counter by the counter 112 under controls by the CPU 1131.

Figure 12:
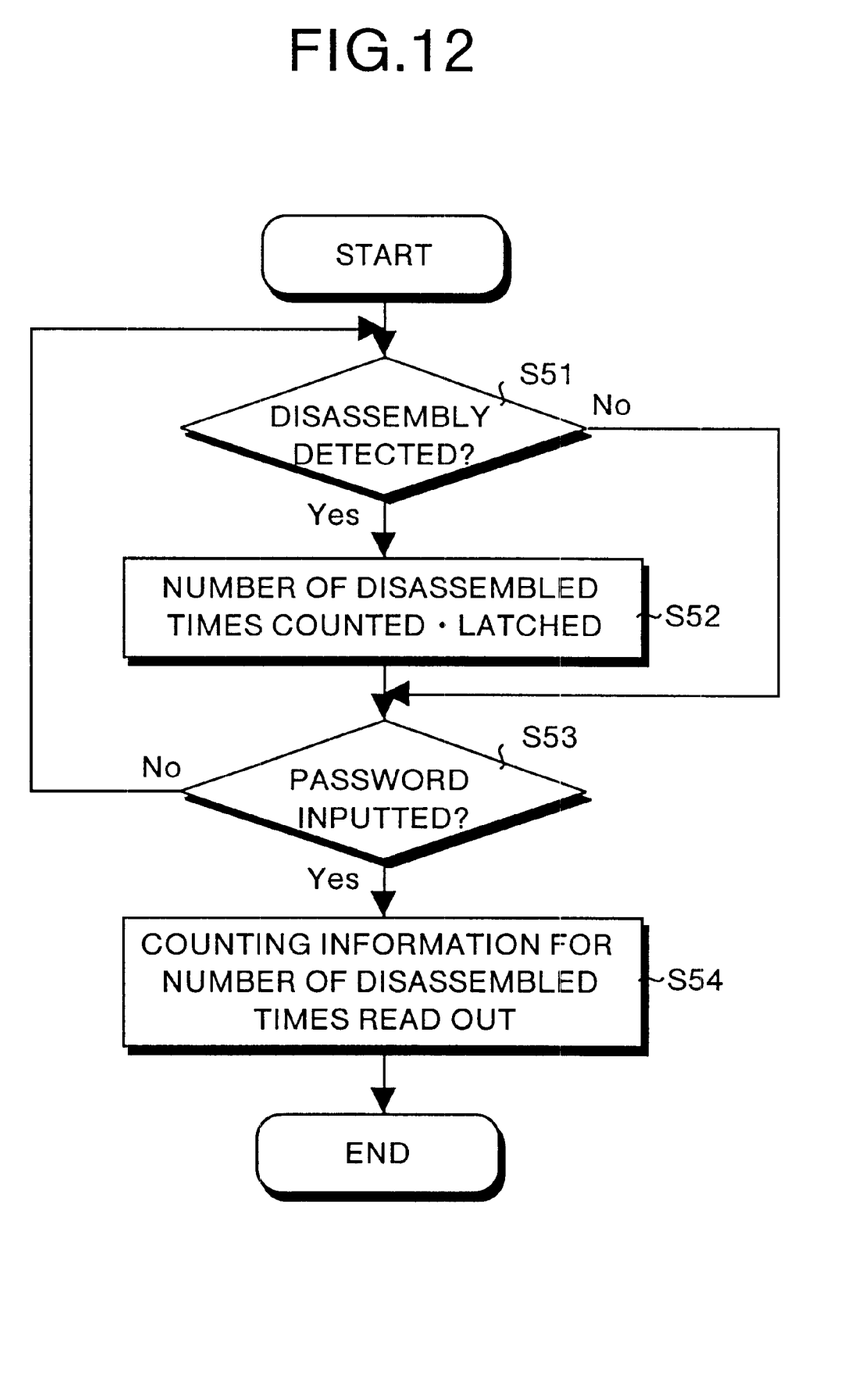
FIG. 12 is a flow chart for explaining a security operation according to Embodiment 5.

Next description is made for an operation. FIG. 12 is a flow chart for explaining a security operation according to Embodiment 5. It should be noted that this flow includes controls by the CPU 1131 and explains about the operation of the entire security device shown in FIG. 11. When disassembly is detected by the disassembly detector 101, like in Embodiment 1 (step S51), the disassembly detection signal is sent to the counter 112. At this time, the counter 112 counts a number of occurrences of the disassembly detection signal, and latches the counted values as a number of disassembled times (step S52).

The CPU 1131 includes the features of processing a password from the keyboard 1135 (step S53), and when a prespecified password for ordinary repair or some other certain reasons is inputted, it is determined that the disassembly is authorized one, and a number of disassembled times stored in the counter 112 is read out and written in the memory 1133, and is displayed on the display (step S54). This number of disassembled times is a history including unauthorized disassembly as well as authorized disassembly, and for this reason, it can be determined whether there have been any illegal adaptations on the casing in the past by subtracting the authorized number of disassembled times from the total number by an authorized repairer. It should be noted that a third person has no chance to know the number of disassembled times latched in the counter 112 unless an appropriate password is inputted.

As described above, with Embodiment 5, a number of disassembled times is counted each time when the casing is disassembled and the number of disassembled times is read out when authorized repair is carried out, so that history of illegal adaptations on the casing can easily be checked. With this feature, when it is found that the casing has been disassembled once for the purpose of illegal adaptations on the equipment or its unauthorized use, the history thereof can be latched, so that it is possible to determine whether there have been any adaptations on the casing for an illegal purpose or the like or not.

As for Embodiments 1 to 5, Embodiments may be combined according to the desired purposes.

An alert is noticed with a sound in Embodiment 1, but the effect in the dark is enhanced by combining an alert with light and sound.

Although the present invention has been described with respect to Embodiments 1 to 5, for a complete and clear disclosure, the appended claims are not be thus limited but are to be construed as embodying all modifications and alternative constructions that may occur to one skilled in the art which fairly fail within the basic teaching herein set forth.

As described above, with the present invention, a contact position of a printed board and that of a case are electrically connected, and a state in which the contact positions are separated is electrically detected, so that the moment at which the electronic equipment is disassembled can be detected, and with this feature, it is possible to obtain a security device which can ensure security for electronic equipment with simple configuration.

With the present invention, at least a portion of a case comprises a frame ground with its contact area as a terminal, and a contact position on at least a part of a printed board comprises a terminal, so that it is possible to obtain a security device which can latch an electrically connected state between the areas with simple configuration.

With the present invention, contact positions are connected with a pull-up resistor, so that it is possible to obtain a security device which can easily detect an act of disassembling a case with electric changes of HIGH and LOW.

With the present invention, when separation between contact positions is detected, an alarm is generated, so that surrounding people can be alerted of illegal acts, such as theft, with simple configuration, and with this feature, it is possible to obtain a security device which can ensure security against theft of information.

With the present invention, when separation between contact positions is detected, data is rewritten, so that, even if data was illegally acquired, the contents of the rewritten data would be meaningless, which can prevent the data itself from theft, and with this feature, it is possible to obtain a security device which can ensure security against theft of information with simple configuration.

With the present invention, a state in which separation between contact positions has been detected is latched, and power supply to electronic equipment is shut down while the state is maintained, so that, when it is found that the equipment has been disassembled once for the purpose of illegal adaptations on the equipment or its unauthorized use, the use of the equipment is forcefully inhibited thereafter, and with this feature, unauthorized use of the equipment due to reassembly after its being shipped can be prevented before its use, and for this reason, it is possible to obtain a security device which can ensure security against theft of information with simple configuration.

With the present invention, a state in which separation between contact positions has been detected is latched, and an operation of electronic equipment is reset while the state is maintained, so that, when it is found that the equipment has been disassembled once for the purpose of illegal adaptations on the equipment or its unauthorized use, the use of the equipment is forcefully inhibited thereafter regardless of power supply being effected or not, and with this feature, unauthorized use of the equipment due to reassembly after its being shipped can be prevented before its use, and for this reason, it is possible to obtain a security device which can ensure security against theft of information with simple configuration.

With the present invention, a value is counted each time when separation between contact positions is detected, and the counted values are read out after authentication, so that, when it is found that the equipment has been disassembled once for the purpose of illegal adaptations on the equipment or its unauthorized use, the history thereof is maintained, and with this feature, determination can be made as to whether there has been any change in the equipment for an illegal purpose or the like or not, and for this reason, it is possible to obtain a security device which can ensure security against theft of information with simple configuration.

This application is based on Japanese patent application No. HEI 10-168964 filed in the Japanese Patent Office on Jun. 16, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A security device applied in electronic equipment comprising:
   a printed board to mount an electronic circuit thereon and having at least one contact position;
   a case accommodating said printed board and having at least one contact position;
   a connecting unit to electrically connect the corresponding contact positions of said printed board and said case;
   a detector to detect an electrical disconnection between the contact positions connected by said connecting unit;
   a latching unit to retain a signal which indicates that separation between the contact positions has been detected by said detector; and
   a shutting-down unit to shut down power supply to said electronic equipment while a signal is being retained by said latching unit.

2. A security device applied in electronic equipment comprising:
   a printed board to mount an electronic circuit thereon and having at least one contact position;
   a case accommodating said printed board and having at least one contact position;
   a connecting unit to electrically connect the corresponding contact positions of said printed board and said case;
   a detector to detect an electrical disconnection between the contact positions connected by said connecting unit;
   a latching unit to retain a signal that indicates that separation between the contact positions has been detected by said detector; and
   a resetting unit to reset the operation of said electronic equipment while a signal is being retained by said latching unit.

3. A security device applied in electronic equipment comprising:
   a printed board to mount an electronic circuit thereon and having at least one contact position;
   a case accommodating said printed board and having at least one contact position;
   a connecting unit to electrically connect the corresponding contact positions of said printed board and said case;
   a detector to detect an electrical disconnection between the contact positions connected by said connecting unit;
   a counting unit to count a number of times a separation between the contact positions is detected by said detector; and
   a reading unit to read out values counted by said counting unit after authentication.

\* \* \* \* \*